United States Patent

Dorkin

[11] 3,898,734
[45] Aug. 12, 1975

[54] SHEARS
[76] Inventor: Jess Dorkin, 1340 S. Ocean Blvd., Pompano Beach, Fla. 33062
[22] Filed: Mar. 29, 1974
[21] Appl. No.: 456,150

[52] U.S. Cl. .................................................. 30/233
[51] Int. Cl.² .......................................... B26B 13/06
[58] Field of Search ............ 30/254, 233, 257, 259, 30/260

[56] References Cited
UNITED STATES PATENTS
995,090 6/1911 Piper.................................... 30/260
1,129,685 2/1915 Jones.................................. 30/233

FOREIGN PATENTS OR APPLICATIONS
21,930 12/1891 United Kingdom.................. 30/254

*Primary Examiner*—Al Lawrence Smith
*Assistant Examiner*—J. C. Peters
*Attorney, Agent, or Firm*—Albert F. Kronman

[57] ABSTRACT

The cutting blades of a shears are offset from the line of cut for a short distance from the tips of the blades. The offset portion stops cutting by the shears out to the tips of the blades thereby preventing pucker or crimping of the material being cut.

5 Claims, 8 Drawing Figures

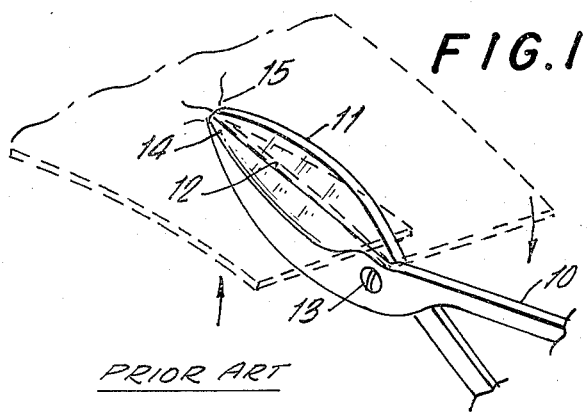
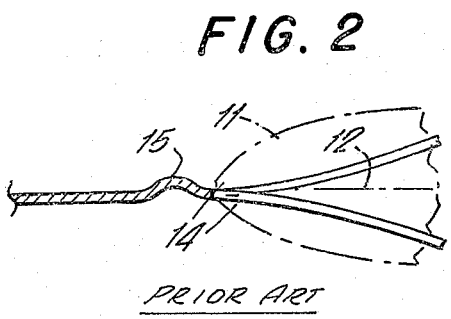
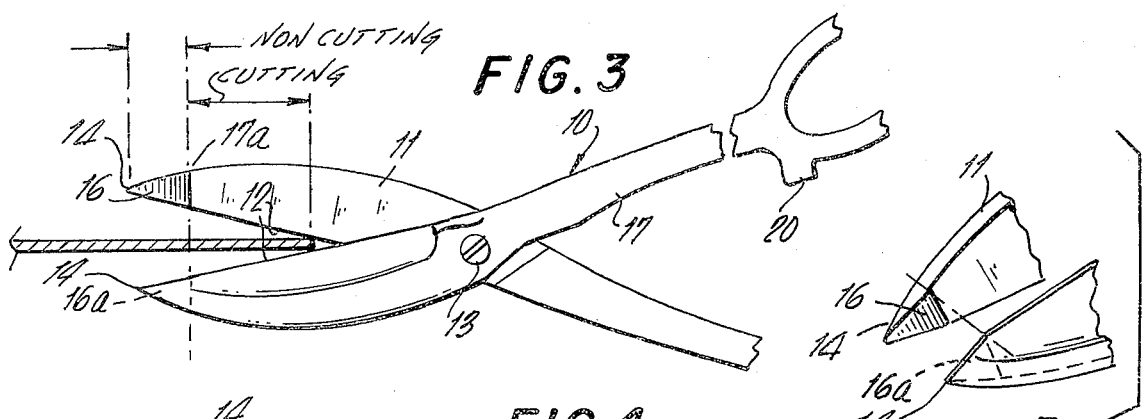
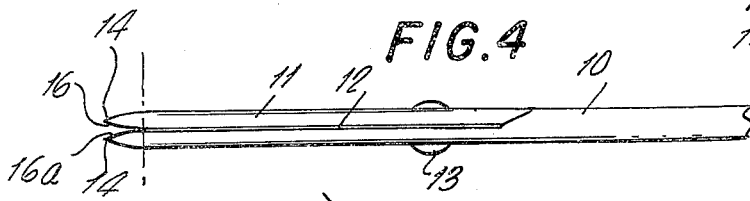
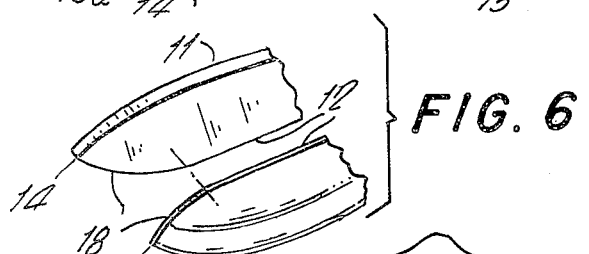
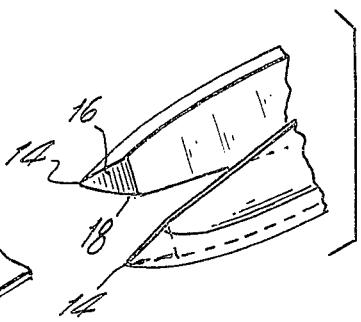

SHEARS

BACKGROUND OF THE INVENTION

Presently known shears or snips used for cutting metal, brittle plastic sheet or semi-rigid material will cause a crimping or deformation or cracking of the cut material in front of the tips of the blades if the blades are fully brought together. This deformation is known as "pucker." By very careful manipulation the cut can be interrupted, with conventional shears, before the blades close completely and thereby avoid pucker or cracking. Accidental closing of the blades, however, is extremely likely, with the result that the work part may be permanently impaired.

Accordingly, it is an object of the present invention to provide shears which will not damage the work part during use.

Another object of the present invention is to provide shears with minimal manufacturing modification, which will improve cutting operations.

A further object of the present invention is to provide shears which lend themselves to the accurate and time saving cutting of metal, plastic and other semi-rigid material.

An object of the present invention is to provide shears which will not damage the work part even when used by careless or inexperienced operators.

SUMMARY

In one preferred embodiment of the present invention the cutting blades of shears are ground or machined away at the outermost or tip portion thereof so that cutting operations can not be carried out for the full length of the blades. As a result, the tips of the blades can not be brought together on the work part to cause damage thereof.

DESCRIPTION OF THE DRAWING

In the accompanying drawing, forming part hereof, corresponding elements have been given the same reference numerals, in which drawing:

FIG. 1 is a somewhat isometric view showing the result a prior art shears will produce if cutting is carried out to the tips of the blades.

FIG. 2 is a fragmentary view in side elevation of the cutting operation shown in FIG. 1.

FIG. 3 is a view in side elevation of the cutting blades and a portion of the handles of a shear made in accordance with the present invention.

FIG. 4 is a top plan view of the shears shown in FIG. 3.

FIG. 5 is a fragmentary exploded view showing the tips of the blades in FIG. 4.

FIG. 6 is a view similar to FIG. 5 showing a modification of the present invention.

FIG. 7 is a fragmentary view showing the tips of the blades in a third embodiment of the present invention.

FIG. 8 is a somewhat isometric view of the work piece following a cut with a shear made in accordance with the present invention.

GENERAL DESCRIPTION

Referring to the drawing and particularly to FIGS. 1 and 2, there is shown a shears or tin snips 10 made in accordance with the prior art. The blades 11 of the shears are formed with cutting edges 12 from a point just forward of the pivot screw 13 to their tips 14. Where easily deformed material such as thin metal sheets, semi-rigid plastic sheets or the like are being cut, a permanent deformation, or pucker 15 will occur if the blade tips 14 are brought together as shown in FIGS. 1 and 2. Such deformation can render the work part useless for its intended purpose; with brittle material, a conventionally closed shear causes a running split or cracked sheet.

It has been found that the danger of deforming or puckering the work part can be eliminated if the last portion of the blade edges 12 adjacent the tips 14 are made non-cutting and displaced from the line of cut. In the embodiment of the present invention shown in FIGS. 3–5 the cutting edges 12 of the blades 11 are ground or machined laterally away from the line of cut and in opposite directions from said line as indicated at 16, 16a. The cutting action ends at a point indicated by line 17a in FIG. 3. Depending upon the type and gauge of material used, and the shape of the end of the blade, the cutting action can be ended anywhere from approximately 150 to 1 inch from the tips 14 of the blades 11, in order to prevent pucker or other damage.

It will be understood by those skilled in the art that the swing of the blades 11 in response to the motion of the shear handles 17 will be limited by means well-known in the art, such as protuberances 20 on the ends of the handles 17 or threaded stop members (not shown). If the tips 14 were not stopped in this manner they might deform the work part even though the blades were formed in the manner shown in FIGS. 3–5.

Referring to FIG. 6 there is shown another form of the present invention in which the cutting edge 12 of the blades 11 are ground or machined in an arcuate configuration as they approach the tips 14 as indicated at 18. Here again, the last ⅛ inch of the blades 11 are rendered non-cutting and the tips will not pucker the work part.

The cut 19 as shown in FIG. 8 is continuous and ends without deformation or pucker of the work part.

It is also within the purview of the present invention to both curve the cutting edges of the blades and grind them back from the line of cut as shown in FIG. 7. This blade configuration will also produce the desired result of cutting without deformation or pucker of the work part.

It will be seen from the foregoing that there have been provided shears structures which are simple to manufacture and lend themselves to presently known shears forming operations but which will not permit damage to the work part being cut despite the carelessness or inexperience of the user. These shears will also speed production in cutting, because the care required to avoid damage or pucker is eliminated.

Having thus fully described the invention, what is claimed and desired to be secured by Letters Patent is:

1. A shears comprising two elongated handle members, a pivot member coupling the handle members is swingable relationship to each other, a cutting blade on one end of each handle member having a generally planar innerface, said blades being in juxtaposition, a blade tip at the end of the blade opposite the handle member, a cutting edge on each blade adapted to receive a work part therebetween, said blade tips having an edge integral with the cutting edge of the blade and extending away from the planar face of the blade.

2. A shears according to claim 1 in which the blade(s) tips are laterally offset from the line of the cutting edge.

3. A shears according to claim 2 in which the lateral offset extends for a distance of at least ⅛ inch.

4. A shears according to claim 1 in which the blades are provided with a radius at the tips thereof, which radius merges with the cutting edges at a point inwardly of the tip extremities.

5. A shears according to claim 1 in which the blades are both laterally offset and provided with a radius extending from the cutting edges.

* * * * *